UNITED STATES PATENT OFFICE.

JOHN EDWIN GILL, OF FRANKLIN, PENNSYLVANIA.

MANUFACTURE OF LUBRICATING COMPOUNDS.

932,855.

No Drawing.

Specification of Letters Patent.   Patented Aug. 31, 1909.

Application filed October 19, 1905.   Serial No. 288,541.

*To all whom it may concern:*

Be it known that I, JOHN EDWIN GILL, a citizen of the United States, residing at Franklin, in the county of Venango and State of Pennsylvania, have invented certain new and useful Improvements in Manufacture of Lubricating Compounds, of which the following is a specification.

My invention relates to improvements in the manufacture of lubricating compounds, particularly those known as "lead-lined" or "galena" oils.

In lubricating compounds of this character it is sought to combine the lubricating advantages of animal and petroleum oils with any of the suitable oxids or carbonates of lead, and for certain purposes, such as the lubrication of journals of railroad cars, it is found that if the compound contains a large proportion of lead its efficiency is greatly increased. In the "galena" oils, or lubricating compounds, heretofore produced, it has been found first, that the desired quantity of lead oxid or carbonate cannot be carried in suspension, as any excess over a given proportion will be precipitated; and second, that the completed compound is always in danger of losing some of its valuable properties by changes in the temperature, and of losing other valuable properties if allowed to stand for any length of time by other causes not thoroughly understood.

By my present invention, I have devised means for producing an improvement in galena oils, or lubricating compound, whereby at least twice as much lead may be successfully incorporated and kept intimately commingled throughout the compound, as compared with what has been heretofore known, and I also succeed in avoiding deterioration by changes in temperature, and from other causes, thereby attaining the double advantage of producing first, a galena compound of much more efficiency for certain purposes, such as railroad car lubrication; and second, the production of this compound in such manner that deterioration thereof from changes in temperature and other causes is avoided.

In practicing my invention, I take a quantity of any suitable animal oil and mix therewith the desired quantity for the given purpose of any lead oxids or lead carbonates, but preferably of flake litharge. No particular proportion or percentage of litharge is required for my invention, as the proportions may be varied according to the different requirements, but I have found by demonstration that as high as twice as much lead-oxid, or lead carbonate, may be used for a given quantity of the finished product as has heretofore been used. The animal oil and lead commingled are then raised to a temperature of from 200° to 300° Fahrenheit, until the litharge and animal product are brought to a homogeneous, thoroughly combined, fluid, to which may be then added such other ingredients, such as tallow or other grease, as may be chosen to form the base of the desired cake of grease which results when the compound is cooled to atmospheric temperature. To give a specific instance, I may take 750 pounds of animal, fish or vegetable oil or fat, mix it with 600 pounds of the oxid or carbonate of lead and heat the same to a temperature of between 200° to 300° Fahrenheit, then add tallow, stearin, or the like, to the amount of from 14000 to 28000 pounds, according to the lead I desire to have in the cake. The grease cake so produced is heavily charged with the lead which has been combined therewith by heat and agitation care having been taken to bring the cake into a thoroughly homogeneous condition, and because of the solid form of the grease cake, the lead element, of course, cannot be precipitated, but will continue intimately combined with the animal product throughout the grease cake, under all conditions.

Where I desire to obtain a more fluid lubricating compound, I next confine a lubricating oil, or oils, preferably petroleum products, adjacent to the grease cake so formed. For the best results, I use several petroleum oils of different specific gravities, confining such oils in an unmixed state adjacent to the grease cake, and by suitable means, as the lubricating compound is required, these confined oils are released in relatively small quantities and fed to the surface of the grease cake, which is simultaneously then worn down in proportion to the quantities of oils so released and supplied to the surface of the grease cake, so that the portion which is worn off the lead-charged grease cake and the released and proportionate quantities of oils are intermingled so as to form the desired lubricating compound, which is at the same time supplied in its freshly compounded state to the surface to be lubricated. While this confinement of the oils adjacent to the grease cake, the release of small quantities of the oils, and the intermingling thereof with a proportionate quantity of the grease cake which is worn away, and the feeding of the resultant compound to the surface to be lubricated, may be accomplished by any suitable mechanism, I consider that the result is best obtained by the arrangement shown in my patents numbered 765,176 and 787,915; in which the lead-charged grease cake is provided with a plurality of cells which open on the lubricating face of the grease cake, and which serve as the oil containers, and the grease cake is yieldingly held in contact with the surface to be lubricated, which surface closes the upper ends of the oil receptacles, so that as the surface to be lubricated moves, it will simultaneously wear down the lubricating face of the grease cake, free the confined oils in quantities proportionate to the amount of the grease cake which is worn off by the movement of the surface to be lubricated, and will mix these elements into the desired compound and at the point where the compound is applied to the surface to be lubricated. Obviously, however, the desired result can be attained by any other mechanism which shall serve to bring about the desired and proportionate commingling of the substance of the grease cake, in limited quantities, with the oils, preferably petroleum oils, which are protected against deterioration until they are released in small quantities for the purpose of being intermingled with the grease cake and applied to the point to be lubricated. So also, for example, this result might be attained more or less efficiently by confining the grease cake in proximity to some of the paraffin waxes in such manner that the grease cake and the paraffin wax would be simultaneously and proportionately worn away, thereby releasing the free oil, which, as is well-known, is often contained in considerable quantities in some of the paraffin waxes.

Regardless, therefore, of whatever mechanism is utilized, it will be seen that I succeed, by my invention, in producing the following result: First. I make it practical to produce a lubricating compound which shall contain a far greater proportion of lead and which, therefore, shall be much more efficient for some requirements than any compound heretofore used. Second. I succeed in producing this result in such a manner as to prevent any possibility of the precipitation or mechanical separation of the lead. Third. I succeed in doing this in such a manner that the lubricating compound when applied to the surface to be lubricated shall have minute quantities of lead thoroughly and uniformly intermingled throughout the entire lubricating compound. Fourth. In the lead-lined oils heretofore used, it has been found necessary to apply the oil to the journal by means of cotton waste, or like packing, which, acting to some extent as a filtering substance, has tended to filter the lead element out of the compound before it reaches the journal, whereas by my invention any such separation of the lead from the compound is avoided. Fifth. I succeed in producing and applying to a journal, or other surface to be lubricated, a compound which shall not only be more highly charged with lead, but which also shall have all the advantages accruing from the combination with one or more petroleum oils, and yet, while the compound may be instantaneously produced and applied whenever required, I avoid any deterioration which has heretofore occurred in such compounds in the manner previously noted.

I claim:

1. The improvement in the art described, which comprises combining a compound of lead with animal oil, subjecting the combination to heat until brought to a homogeneous fluid condition, adding a quantity of animal product which is solid or semi-solid at ordinary temperature thereto, and cooling the resulting compound to a homogeneous, relatively solid mass.

2. The improvement in the art described, which comprises combining a compound of lead with an animal product, subjecting the combination to heat until brought to a homogeneous fluid condition, cooling the fluid to a relatively solid mass, and thereafter continuously and mechanically combining small quantities of said product with proportionate quantities of a petroleum oil so as to continuously produce the resulting lubricating compound as the same is required for consumption.

3. The improvement in the art described, which consists in combining a compound of lead with oily matter, heating the same to a temperature sufficient to combine the elements into a homogeneous fluid mass, then adding an animal fat which is solid or semi-solid at ordinary temperatures to compose the base of the cake to be formed, and allowing the same to cool.

JOHN EDWIN GILL.

Witnesses:
J. M. SIMPSON,
WM. B. GRIFFEN.